(12) United States Patent
Butler

(10) Patent No.: US 11,240,102 B2
(45) Date of Patent: Feb. 1, 2022

(54) PERIPHERAL DEVICE IDENTIFICATION SYSTEM AND METHOD

(71) Applicant: Learning Squared, Inc., Sunnyvale, CA (US)

(72) Inventor: Andrew Butler, Sunnyvale, CA (US)

(73) Assignee: Learning Squared, Inc., Sunnyvale, CA (US)

( * ) Notice: Subject to any disclaimer, the term of this patent is extended or adjusted under 35 U.S.C. 154(b) by 0 days.

(21) Appl. No.: 17/047,520

(22) PCT Filed: May 8, 2019

(86) PCT No.: PCT/US2019/031263
§ 371 (c)(1),
(2) Date: Oct. 14, 2020

(87) PCT Pub. No.: WO2019/217518
PCT Pub. Date: Nov. 14, 2019

(65) Prior Publication Data
US 2021/0152422 A1 May 20, 2021

Related U.S. Application Data

(60) Provisional application No. 62/668,787, filed on May 8, 2018.

(51) Int. Cl.
*G06F 15/177* (2006.01)
*H04L 12/24* (2006.01)
(Continued)

(52) U.S. Cl.
CPC ........ *H04L 41/0806* (2013.01); *G06K 7/1417* (2013.01); *G06K 19/06037* (2013.01); *G09B 17/006* (2013.01)

(58) Field of Classification Search
USPC .......................................... 709/220
See application file for complete search history.

(56) References Cited

U.S. PATENT DOCUMENTS 9,686,026 B1 * 6/2017 Reed ................ G06K 19/06037
9,736,541 B1 * 8/2017 Nijim ................. H04N 21/8146
(Continued)

FOREIGN PATENT DOCUMENTS

CN 112074886 12/2020
IN 202017051835 2/2021
(Continued)

OTHER PUBLICATIONS

"International Application Serial No. PCT/US2019/031263, International Preliminary Report on Patentability dated Aug. 24, 2020", 6 pgs.

(Continued)

*Primary Examiner* — Anthony Mejia
(74) *Attorney, Agent, or Firm* — Schwegman Lundberg & Woessner, P.A

(57) ABSTRACT

A system and method for dynamically identifying an accessory or other peripheral device to be wirelessly paired with a tablet computer or other primary device, wherein the accessory comprises a display screen that displays a quick response (QR) code when the accessory is not paired, and after the QR code is scanned by the tablet computer, which is then wirelessly paired with the accessory, the QR code is replaced on the display screen with an image associated with the user, such as a picture of the user, the users name, or other means of associating the accessory with the user.

20 Claims, 4 Drawing Sheets

(51) Int. Cl.
*G06K 7/14* (2006.01)
*G06K 19/06* (2006.01)
*G09B 17/00* (2006.01)

(56) References Cited

U.S. PATENT DOCUMENTS

| | | | |
|---|---|---|---|
| 9,911,073 B1* | 3/2018 | Spiegel | G06T 7/33 |
| 9,985,786 B1* | 5/2018 | Bhabbur | H04L 9/3226 |
| 10,169,626 B2* | 1/2019 | Britt | H04L 67/10 |
| 10,714,055 B1* | 7/2020 | Strasdat | G09G 5/377 |
| 10,825,352 B2 | 11/2020 | Butler et al. | |
| 2012/0303476 A1 | 11/2012 | Krzyzanowski et al. | |
| 2013/0046594 A1* | 2/2013 | Davidson | G06Q 30/02 705/14.4 |
| 2013/0295535 A1* | 11/2013 | Levy | G09B 17/003 434/169 |
| 2016/0035241 A1* | 2/2016 | Butler | G09B 17/003 434/113 |
| 2016/0062572 A1 | 3/2016 | Yang et al. | |
| 2016/0132840 A1* | 5/2016 | Bowles | G06Q 10/30 705/306 |
| 2017/0098389 A1* | 4/2017 | Liu | G09B 17/006 |
| 2017/0242480 A1* | 8/2017 | Dees | G06F 3/013 |
| 2017/0330479 A1* | 11/2017 | Bowman | G09B 5/125 |
| 2018/0033211 A1* | 2/2018 | Berman | H04N 13/344 |
| 2018/0240095 A1* | 8/2018 | Buckley | G06Q 20/322 |
| 2019/0230505 A1* | 7/2019 | Stimm | H04L 63/18 |
| 2019/0325498 A1* | 10/2019 | Clark | G06K 7/1417 |
| 2020/0058230 A1* | 2/2020 | Hosp | G09B 7/04 |
| 2020/0127866 A1* | 4/2020 | Lee | A47L 9/2894 |
| 2020/0143131 A1* | 5/2020 | Fan | G06K 7/1456 |
| 2020/0367056 A1* | 11/2020 | Hodge | H04W 12/009 |

FOREIGN PATENT DOCUMENTS

| | | |
|---|---|---|
| WO | WO-2011135352 A1 | 11/2011 |
| WO | WO-2019217518 A1 | 11/2019 |

OTHER PUBLICATIONS

"International Application Serial No. PCT/US2019/031263, International Search Report dated Aug. 29, 2019", 3 pgs.
"International Application Serial No. PCT/US2019/031263, Written Opinion dated Aug. 29, 2019", 6 pgs.
"European Application Serial No. 19798924.7, Extended European Search Report dated Mar. 5, 2021", 9 pgs.

* cited by examiner

PERIPHERAL DEVICE IDENTIFICATION SYSTEM AND METHOD

RELATED APPLICATION

This application is a U.S. National Stage Filing under 35 U.S.C. 371 from International Application No. PCT/US2019/031263, filed on May 8, 2019, and published as WO 2019/217518, which claims the benefit of priority to U.S. Provisional Patent Application Ser. No. 62/668,787, filed May 8, 2018, each of which is incorporated herein by reference in their entirety.

TECHNICAL FIELD

The subject matter disclosed herein generally relates to the technical field of special-purpose machines that perform or otherwise facilitate pairing of a computer with one or more peripheral devices, including software-configured computerized variants of such special-purpose machines and improvements to such variants, and to the technologies by which such special-purpose machines become improved compared to other special-purpose machines that perform or otherwise facilitate pairing of a computer with one or more peripheral devices. Specifically, the present disclosure addresses systems and methods to facilitate peripheral device identification. For example, when used in the context of educational instruction and exploration systems for children such system and methods may perform or otherwise facilitate identification and pairing of one or more educational accessory devices (e.g., for teaching children in a classroom setting).

BACKGROUND

U.S. patent application Ser. No. 14/816,536, filed Aug. 3, 2015, discloses a symbol manipulative identification dock that can be wirelessly paired with a tablet computing device to teach literacy skills to children. The child places symbol-shaped (e.g., letter-shaped) manipulatives on the dock, which wirelessly communicates information about the manipulatives on the dock with the tablet computing device. The tablet computing device uses this information to identify the manipulatives connected to the dock and the order of their arrangement. This enables the child to perform tasks that improve their literacy skills, or to play games that use their literacy skills.

While this system is simple to use in a home setting, where only one child pairs a dock with one tablet computing device, this becomes more complicated when there are two or more children, each one having a corresponding dock and tablet. In a classroom setting, where there are multiple children, multiple docks, and multiple tablet computing devices, managing the wireless pairing between many docks and tablets can become very difficult. The logistical management of classroom equipment often includes their collection and segregation in shelves or cabinets at the end of lessons. Alternatively, it is common for the letter docks to be a school resource collected and stored at the end of lessons, while the tablets belonging to the students are taken home at the end of each day. Also, it is common for children to swap or mix up computing devices or docks. Each of these circumstances create logistical difficulties for teachers as they direct each child to select a dock, set it up with that child's tablet, and begin working on the next lesson.

Educational curricula in schools are moving to higher levels of technology integration as computer and human interface technologies evolve to more natural forms of interaction. They are integrating newer forms of computer devices including tablets with more natural interactivity and a range of wireless accessories tailored to education and classroom settings. The logistical pairing difficulties faced in pairing letter docks to tablets is also a general problem that confronts a range of other wireless pairing computer accessories acquired by schools for use in classrooms.

There exists a need for systems and methods that allow pre-school, pre-kindergarten, and kindergarten children in a classroom environment to easily introduce a computer accessory to their computing device, for each child's computing device to uniquely identify the corresponding computer accessory and pair with it, and for the computing accessory to clearly identify to which child and to which tablet the computing accessory belongs or otherwise corresponds.

BRIEF DESCRIPTION OF THE DRAWINGS

Some embodiments are illustrated by way of example and not limitation in the figures of the accompanying drawings.

DETAILED DESCRIPTION

Example methods (e.g., algorithms) facilitate peripheral device identification (e.g., identification of a computer accessory or other peripheral device), and example systems (e.g., special-purpose machines configured by special-purpose software) are configured to facilitate peripheral device identification. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Figure 1:
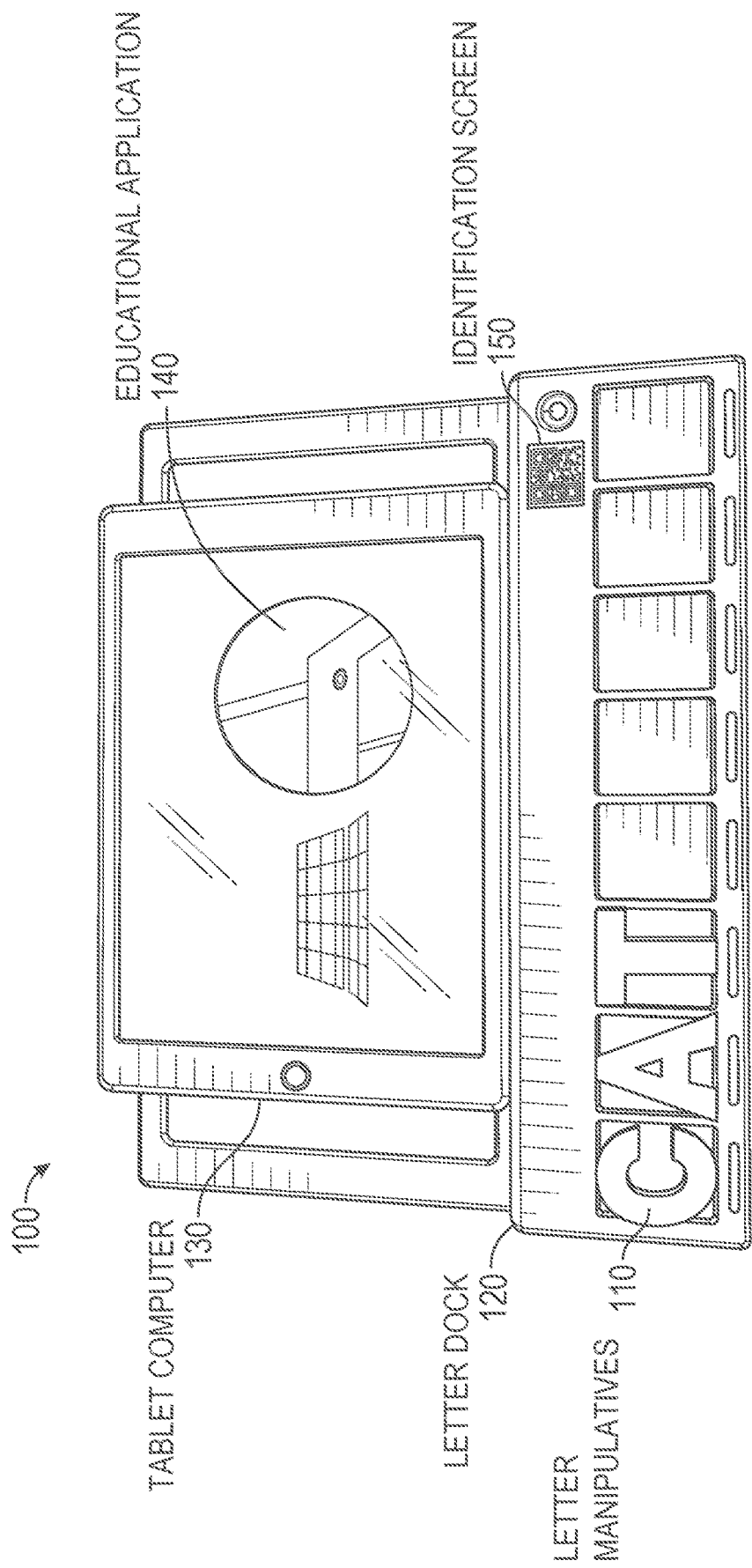
FIG. 1 is a front view of a tablet computer and a symbol manipulative identification dock in an unpaired (e.g., pre-pairing or post-pairing) operating condition, according to some example embodiments.

FIG. 1 is a front view of a tablet computer 130 and a symbol manipulative identification dock 120 (e.g., denoted as "letter dock" for brevity in FIGS. 1 and 2, although various example embodiments of the symbol manipulative identification dock 120 are not limited to letters only) in a first operating condition that may be or include an unpaired (e.g., pre-pairing or post-pairing) operating condition, according to some example embodiments. In combination, the symbol manipulative identification dock 120 and the tablet computer 130 may be considered an instructional system 100 (e.g., an educational system or other system for teaching one or more users). The symbol manipulative identification dock 120 may be of the type disclosed in U.S. patent application Ser. No. 14/816,536, though it may also be used with any other wireless peripheral device (e.g., a wireless computing accessory), and the present discussion should not be construed as being limited to this specific type of peripheral device.

A user (e.g., a child) is associated with the tablet computer 130 and may be a user of the tablet computer 130 (e.g., a sole user of the tablet computer 130 or alternatively one of multiple users of the tablet computer 130). In alternative example embodiments, the tablet computer 130 may instead be a desktop computer, a vehicle computer, a home media system (e.g., a home theater system or other home entertainment system), a navigational device, a portable media device, a smart phone, or a wearable device (e.g., a smart watch, smart glasses, smart clothing, or smart jewelry) belonging to the user.

As shown in FIG. 1, the symbol manipulative identification dock 120 includes an identification screen 150 (e.g., a small display screen for, among other things, peripheral device identification, such as identification of the symbol manipulative identification dock 120). The identification screen 150 may be implemented with a small physical size, for example, to prevent distractions, to reduce power use, or both. In an example embodiment, as shown in FIG. 1, the identification screen 150 is about 5 cm by 5 cm (approximately 2 inches by 2 inches) in size and can be implemented in a range of display technologies including liquid crystal display (LCD), e-paper, organic light emitting diode (OLED), or any suitable combination thereof.

According to some example embodiments, before the symbol manipulative identification dock 120 can be wirelessly paired with or otherwise wirelessly connected to a tablet computer (e.g., the tablet computer 130), the symbol manipulative identification dock 120 should be powered up. On powering up, the symbol manipulative identification dock 120 displays a corresponding (e.g., uniquely) one-dimensional or two-dimensional optically readable code (e.g., a one-dimensional barcode, or a two-dimensional quick response (QR) code or other two-dimensional barcode) on its identification screen 150. In certain example embodiments, as shown in FIG. 1, a QR code is used and may take any of several forms to enhance its usability and appeal, including, for example, being accompanied by a cute cartoon character, being customizable by users with embedded colors or character icons while retaining its unique identification codes, or both.

The user (e.g., a child) then launches or otherwise activates an educational application 140 on the tablet computer 130, which is caused by the educational application 140 to begin scanning for the optically readable code (e.g., the QR code) with a video camera embedded in the tablet computer 130. The educational application 140 may be or include software that enables it to scan and interpret such optically readable codes (e.g., QR codes). The optically readable code (e.g., the QR code) may include identification information for the symbol manipulative identification dock 120, a wireless interface identification number or other code (e.g., a wireless interface II)), dock status, other useful information (e.g., necessary information) for a pairing or other interaction, or any suitable combination thereof.

On reading the optically readable code (e.g., the QR code) being displayed by the identification screen 150 of the symbol manipulative identification dock 120, the tablet computer 130 (e.g., as configured by the educational application 140) then wirelessly pairs with the symbol manipulative identification dock 120. The wireless pairing may be or include a Bluetooth® pairing, according to some example embodiments, while various example embodiments may be or include one or more other forms of short-range wireless network connectivity.

Once the tablet computer 130 is paired with the symbol manipulative identification dock 120, the tablet computer 130 (e.g., as configured by the educational application 140) then transmits a photo or other image of the user (e.g., the child's photo) to the dock. In some example embodiments, such a photo may be taken (e.g., by the video camera of the tablet computer 130) after the pairing is complete, while in other example embodiments, the photo may be stored in the tablet computer 130 or in the user's records stored remotely (e.g., in a cloud database). A photo is used in the example embodiment illustrated in FIG. 2. However, in various example embodiments, additional or other identifying information, such as the user's name, an avatar of the user (e.g., a cartoon character chosen or designed by the user), or any suitable combination thereof, may be used.

Figure 2:
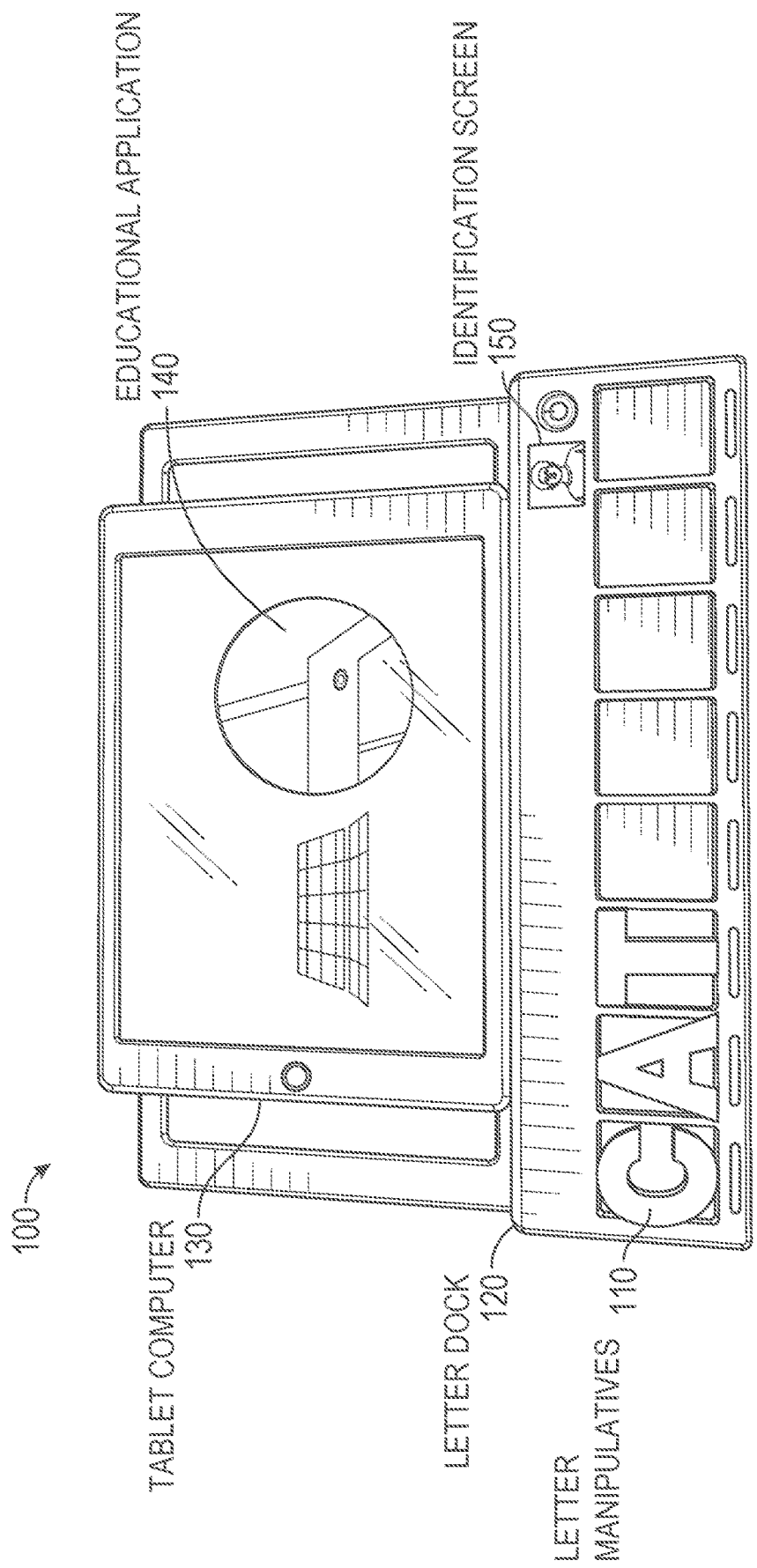
FIG. 2 is a front view of the tablet computer and the symbol manipulative identification dock in a paired operating condition, according to some example embodiments.

FIG. 2 is a from view of the tablet computer 130 and the symbol manipulative identification dock 120 in a second operating condition that may be or include a paired operating condition (e.g., in which the tablet computer 130 and the symbol manipulative identification dock 120 are paired with each other), according to some example embodiments.

Once the photo is transmitted to the symbol manipulative identification dock 120, the photo is displayed on the identification screen 150, as shown in FIG. 2. According to various example embodiments, the photo remains continuously displayed on the identification screen 150 for as long as the pairing is maintained (e.g., while the wireless networking connection is valid). This enables the user (e.g., the child) to easily find the symbol manipulative identification dock 120 that is paired with his or her tablet computer 130. If the pairing (e.g., the Bluetooth® connection) is interrupted at any point, the user's photo (e.g., the child's picture) is removed from the identification screen 150, and the optically readable code (e.g., the QR code) is displayed again. This enables the dock to be paired with another tablet computer (e.g., different from the tablet computer 130).

Any of the systems or machines (e.g., computers or devices) shown in FIG. 1 or FIG. 2 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 4, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 3:
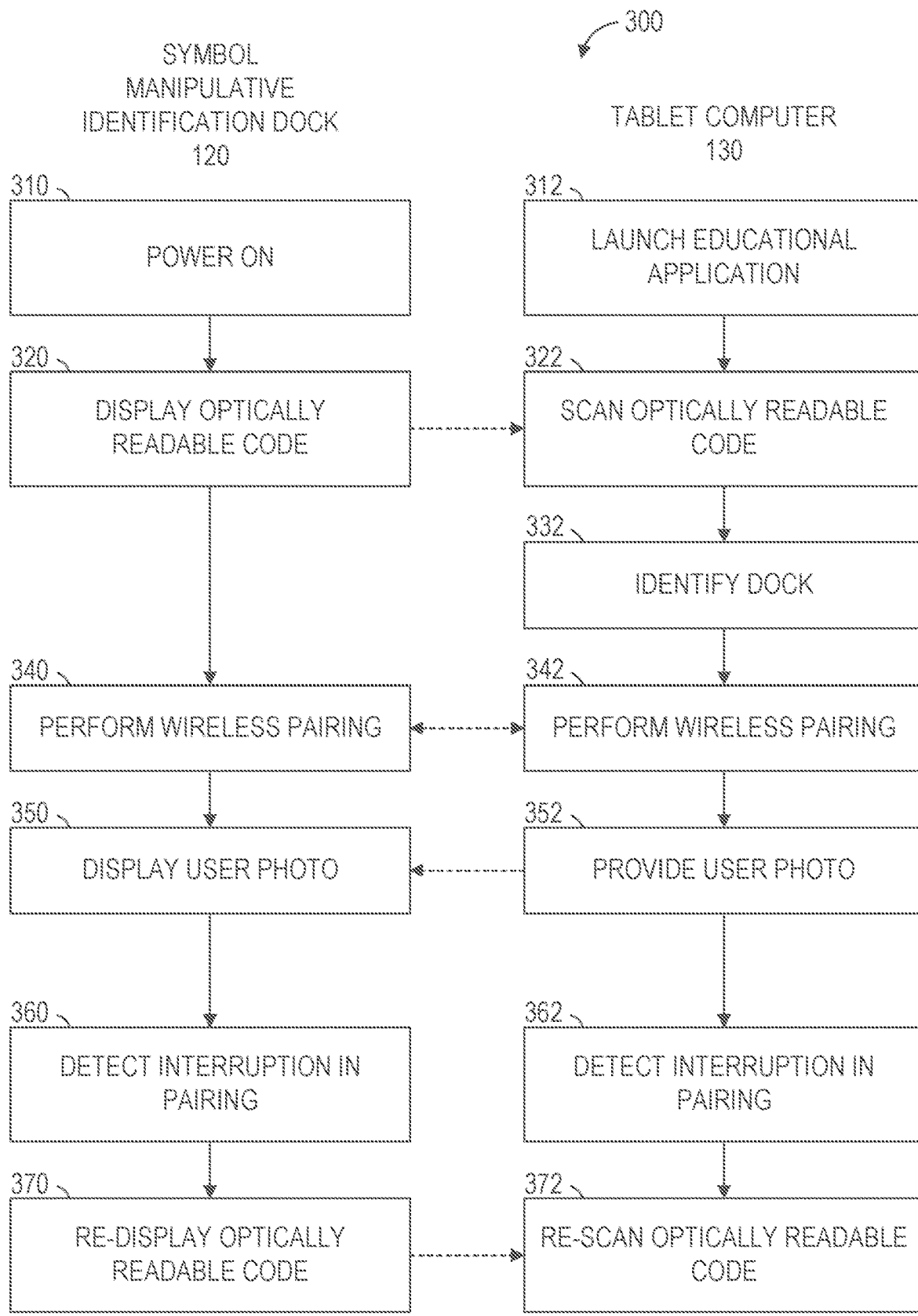
FIG. 3 is a flowchart illustrating operations of the tablet computer and the symbol manipulative identification dock in performing a method by which the tablet computer identifies the symbol manipulative identification dock and wirelessly pairs with the symbol manipulative identification dock, according to some example embodiments.

FIG. 3 is a flowchart illustrating operations of the tablet computer 130 and the symbol manipulative identification dock 120 in performing a method 300 by which the tablet computer 130 identifies the symbol manipulative identification dock 120 and wirelessly pairs with the symbol manipulative identification dock 120, according to some example embodiments. Operations in the method 300 may be performed by the tablet computer 130 and the symbol manipulative identification dock 120, including by one or more processors (e.g., microprocessors or other hardware processors) thereof. As shown in FIG. 3, the method 600 includes operations 310, 320, 340, 350, 360, and 370 for the symbol manipulative identification dock 120, operations 312, 322, 332, 342, 352, 362, and 372 for the tablet computer 130, or any suitable combination thereof.

In operation 310, the symbol manipulative identification dock 120 is powered on. For example, this may occur as a result of the user activating a power switch of the symbol manipulative identification dock 120.

In operation 320, the symbol manipulative identification dock 120 displays an optically readable code (e.g., a QR code or other barcode). As noted above, this optically readable code may correspond (e.g., uniquely) to the symbol manipulative identification dock 120. Furthermore, the optically readable code may be displayed on the identification screen 150 of the symbol manipulative identification dock 120, as discussed above. Operation 320 may be performed in response to the powering on of the symbol manipulative identification dock 120 in operation 310.

In operation 312, the tablet computer 130 executes (e.g., launches) the educational application 140. For example, this may occur as a result of the user activating an icon that corresponds to the educational application 140 or otherwise causing the educational application of 140 to run on the tablet computer 130.

In operation 322, the tablet computer 130 (e.g., as configured or otherwise caused by the executing educational application 140) scans or otherwise reads the optically readable code (e.g., the QR code) being displayed by the identification screen 150 of the symbol manipulative identification dock 120. According to various example embodiments, operation 322 may be performed using a camera (e.g., a webcam) of the tablet computer 130 and may be performed in response to the executing of the educational application 140 in operation 312.

In operation 332, based on the scanned or otherwise read optically readable code that corresponds (e.g., uniquely) to the symbol manipulative identification dock 120, the tablet computer 130 (e.g., as configured or otherwise caused by the executing educational application 140) identifies the symbol manipulative identification dock 120.

In operation 340, the symbol manipulative identification dock 120 performs wireless pairing (e.g., via Bluetooth®) with the tablet computer 130, and in parallel contemporaneous operation 342, the tablet computer 130 performs corresponding wireless pairing with the symbol manipulative identification dock 120. One or both of these operations may be performed in response to the identification of the symbol manipulative identification dock 120 by the tablet computer 130 in operation 332.

In operation 352, the tablet computer 130 (e.g., as configured or otherwise caused by the educational application 140 as it executes) provides an image that corresponds to a user (e.g., a photo of the user, or an image of an avatar of the user) to the symbol manipulative identification dock 120. This image may be provided (e.g., transmitted) via the wireless network connection established by the wireless pairing performed in operations 340 and 342. Furthermore, according to various example embodiments, operation 352 may be performed in response to any one or more of operations 332, 340, or 342.

In operation 350, the symbol manipulative identification dock 120 displays the image provided by the tablet computer 130 in operation 352. This image may be displayed on the identification screen 150 of the symbol manipulative identification dock 120, as discussed above. In some example embodiments, operation 350 is performed in response to reception of the provided image as a result of operation 352. In certain example embodiments, the image is accessible from remote storage (e.g., a cloud database), and the symbol manipulative identification dock 120 obtains the image therefrom (e.g., without the tablet computer 130 providing the image) for subsequent display on the identification screen 150.

In operation 360, the symbol manipulative identification dock 120 detects that the previously established wireless pairing (e.g., the Bluetooth® connection) with the tablet computer 130 has been broken or otherwise interrupted, and in parallel contemporaneous operation 362, the tablet computer 130 likewise detects that the wireless pairing has been lost with the symbol manipulative identification dock 120.

In response to operation 360, the symbol manipulative identification dock 120 performs operation 370 by reverting to displaying (e.g., re-displaying) the same optically readable code discussed above to respect to operation 320. In parallel or otherwise contemporaneously, in response to operation 362, the tablet computer 130 performs operation 372 by reverting to scanning or otherwise reading optically readable codes in the manner discussed above with respect to operation 322.

According to various example embodiments, one or more of the methodologies described herein may facilitate identification of one or more peripheral devices (e.g., the symbol manipulative identification dock 120) by a primary device (e.g., the tablet computer 130). Moreover, one or more of the methodologies described herein may facilitate wireless pairing of the identified peripheral device with the primary device. Hence, one or more of the methodologies described herein may facilitate introduction of a peripheral device (e.g., a computer accessory) to the primary device, as well as facilitate clear identification of to which user (e.g., which child) and to which primary device in the peripheral device belongs or otherwise corresponds, compared to capabilities of pre-existing systems and methods.

Figure 4:
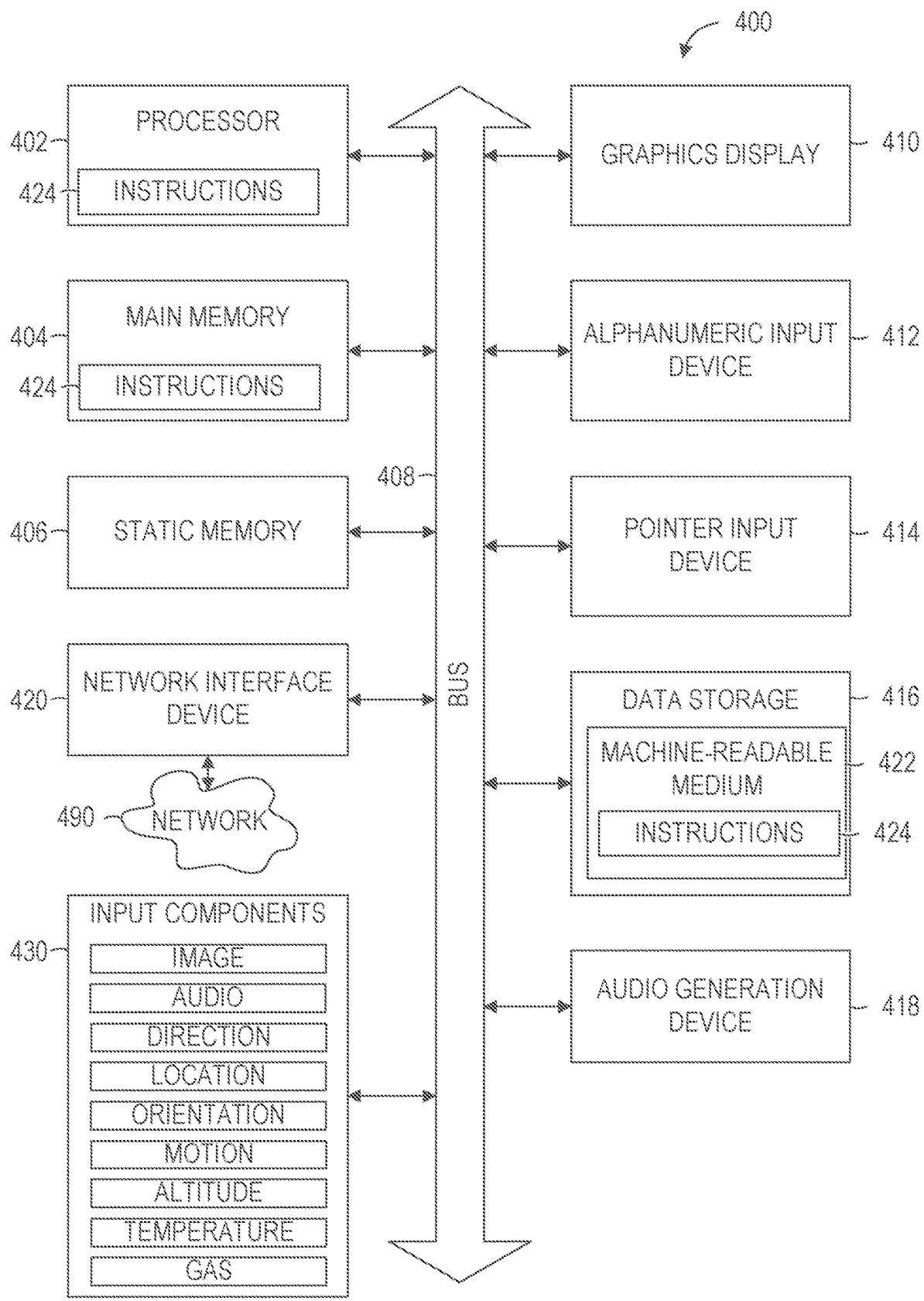
FIG. 4 is a block diagram illustrating components of a machine, according to some example embodiments, able to read instructions from a machine-readable medium and perform any one or more of the methodologies discussed herein.

FIG. 4 is a block diagram illustrating components of a machine 400, according to some example embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 40 in the example form of a computer system (e.g., a computer, such as the tablet computer 130 or the symbol manipulative identification dock 120) within which the instructions 424 (e.g., software, a program, an application, an applet, an app, or other executable code) for causing the machine 400 to perform any one or more of the methodologies discussed herein may be executed, in whole or in part.

In alternative embodiments, the machine 400 operates as a standalone device or may be communicatively coupled (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 404, and a static memory 406, which are configured to communicate with each other via a bus 408. The processor 402 contains solid-state digital microcircuits (e.g., electronic, optical, or both) that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein. In some example embodiments, the processor 402 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 400 with at least the processor 402, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a pointer input device 414 (e.g., a mouse, a touchpad, a touchscreen, a trackball, a joystick, a stylus, a motion sensor, an eye tracking device, a data glove, or other pointing instrument), a data storage 416, an audio generation device 418 (e.g., a sound card, an amplifier, a speaker, a headphone jack, or any suitable combination thereof), and a network interface device 420.

The data storage 416 (e.g., a data storage device) includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the static memory 406, within the processor 402 (e.g., within the processor's cache memory), or any suitable combination thereof, before or during execution thereof by the machine 400. Accordingly, the main memory 404, the static memory 406, and the processor 402 may be considered machine-readable media (e.g., tangible and non-transitory machine-readable media). The instructions 424 may be transmitted or received over a network 490 via the network interface device 420. For example, the network interface device 420 may communicate the instructions 424 using any one or more transfer protocols (e.g., hypertext transfer protocol (HTTP)).

In some example embodiments, the machine 400 may be a portable computing device (e.g., a smart phone, a tablet computer, or a wearable device) and may have one or more additional input components 430 (e.g., sensors or gauges). Examples of such input components 430 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 430 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 424 for execution by the machine 400 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 424).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuity (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining" "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction"or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising.
reading, via a video camera and by one or more processors of a primary device, an optically readable code displayed by a display screen of a peripheral device to be identified for use by a user;
identifying, by one or more processors of the primary device, the peripheral device based on the read optically readable code displayed by the display screen of the peripheral device;
performing, by one or more processors of the primary device, a wireless network pairing of the primary device to the identified peripheral device on whose display screen the read optically readable code is displayed; and
in response to the identifying of the peripheral device, and by one or more processors of the primary device, providing the identified peripheral device with an image that corresponds to the user to use the identified peripheral device, the identified peripheral device being configured to substitute display of the provided image that corresponds to the user for display of the read optically readable code on the display screen of the peripheral device, the substituted display of the provided image indicating that the peripheral device corresponds to the user.

A second example provides a method according to the first example, wherein:
during display of the optically readable code on the display screen of the peripheral device, the displayed optically readable code indicates that the peripheral device is available for wireless network pairing.

A third example provides a method according to the first example or the second example, wherein:
during display of the image that corresponds to the user on the display screen of the peripheral device, the displayed image that corresponds to the user indicates that the peripheral device is unavailable for wireless network pairing.

A fourth example provides a method according to any of the first through third examples, wherein:
the optically readable code includes a QR code unique to the peripheral device among a plurality of peripheral devices wirelessly pairable with the primary device.

A fifth example provides a method according to any of the first to fourth examples, further comprising:
detecting that the wireless network pairing between the primary device and the peripheral device is interrupted; and
reading, via the video camera, a further optically readable code displayed by a further display screen of a further peripheral device to be identified.

A sixth example provides a method comprising:
displaying, on a display screen of a peripheral device and by one or more processors of the peripheral device, an optically readable code for reading by a primary device of a user, the primary device being configured to read the displayed optically readable code via a video camera of the primary device and identify the peripheral device based on the displayed and read optically readable code;
performing, by one or more processors of the peripheral device, a wireless network pairing of the peripheral device to the primary device of the user in response to the primary device identifying the peripheral device based on the displayed and read optically readable code;
accessing, by one or more processors of the peripheral device, an image that corresponds to the user of the primary device; and
substituting, by one or more processors of the peripheral device, display of the accessed image that corresponds to the user for display of the read optically readable code on the display screen of the peripheral device, the substituted display of the accessed image indicating that the peripheral device corresponds to the user.

A seventh example provides a method according to the sixth example, wherein:
during display of the optically readable code on the display screen of the peripheral device, the displayed optically readable code indicates that the peripheral device is available for wireless network pairing.

An eighth example provides a method according to the sixth example or the seventh example, wherein:
during display of the image that corresponds to the user on the display screen of the peripheral device, the displayed image that corresponds to the user indicates that the peripheral device is unavailable for wireless network pairing.

A ninth example provides a method according to any of the sixth through eighth examples, wherein:
the optically readable code includes a QR code unique to the peripheral device among a plurality of peripheral devices wirelessly pairable with the primary device.

A tenth example provides a method according to any of the sixth through ninth examples, further comprising:
detecting that the wireless network pairing between the peripheral device and the primary device is interrupted; and
re-displaying, on the display screen of the peripheral device, the optically readable code for reading by a further primary device of a further user.

An eleventh example provides a machine-readable medium (e.g., a non-transitory machine-readable storage medium) comprising instructions that, when executed by one or more processors of a primary device, cause the primary device to perform operations comprising:

reading, via a video camera of the primary device, an optically readable code displayed by a display screen of a peripheral device to be identified for use by a user;

identifying the peripheral device based on the read optically readable code displayed by the display screen of the peripheral device;

performing a wireless network pairing of the primary device to the identified peripheral device on whose display screen the read optically readable code is displayed; and in response to the identifying of the peripheral device, providing the identified peripheral device with an image that corresponds to the user to use the identified peripheral device, the identified peripheral device being configured to substitute display of the provided image that corresponds to the user for display of the read optically readable code on the display screen of the peripheral device, the substituted display of the provided image indicating that the peripheral device corresponds to the user.

A twelfth example provides a machine-readable medium according to the eleventh example, wherein:

during display of the optically readable code on the display screen of the peripheral device, the displayed optically readable code indicates that the peripheral device is available for wireless network pairing.

A thirteenth example provides a machine-readable medium according to the eleventh example or the twelfth example, wherein, during display of the image that corresponds to the user on the display screen of the peripheral device, the displayed image that corresponds to the user indicates that the peripheral device is unavailable for wireless network pairing.

A fourteenth example provides a machine-readable medium according to any of the eleventh through thirteenth examples, wherein the operations further comprise:

detecting that the wireless network pairing between the primary device and the peripheral device is interrupted; and reading, via the video camera, a further optically readable code displayed by a further display screen of a further peripheral device to be identified.

A fifteenth example provides a machine-readable medium (e.g., a non-transitory machine-readable storage medium) comprising instructions that, when executed by one or more processors of a peripheral device, cause the peripheral device to perform operations comprising:

displaying, on a display screen of the peripheral device, an optically readable code for reading by a primary device of a user, the primary device being configured to read the displayed optically readable code via a video camera of the primary device and identify the peripheral device based on the displayed and read optically readable code;

performing a wireless network pairing of the peripheral device to the primary device of the user in response to the primary device identifying the peripheral device based on the displayed and read optically readable code, accessing an image that corresponds to the user of the primary device; and substituting display of the accessed image that corresponds to the user for display of the read optically readable code on the display screen of the peripheral device, the substituted display of the accessed image indicating that the peripheral device corresponds to the user.

A sixteenth example provides a machine-readable medium according to the fifteenth example, wherein:

during display of the optically readable code on the display screen of the peripheral device, the displayed optically readable code indicates that the peripheral device is available for wireless network pairing.

A seventeenth example provides a machine-readable medium according to the fifteenth example or the sixteenth example, wherein:

during display of the image that corresponds to the user on the display screen of the peripheral device, the displayed image that corresponds to the user indicates that the peripheral device is unavailable for wireless network pairing.

An eighteenth example provides a machine-readable medium according to any of the fifteenth to seventeenth examples, wherein the operations further comprise:

detecting that the wireless network pairing between the primary device and the peripheral device is interrupted; and reading, via the video camera, a further optically readable code displayed by a further display screen of a further peripheral device to be identified.

A nineteenth example provides a primary device comprising:

a pairable wireless network interface;

a video camera;

one or more processors; and a memory storing instructions that, when executed by at least one processor among the one or more processors, cause the primary device to perform operations comprising:

reading, via the video camera, an optically readable code displayed by a display screen of a peripheral device to be identified for use by a user;

identifying the peripheral device based on the read optically readable code displayed by the display screen of the peripheral device;

performing, via the pairable wireless network interface, a wireless network pairing of the primary device to the identified peripheral device on whose display screen the read optically readable code is displayed; and in response to the identifying of the peripheral device, providing the identified peripheral device with an image that corresponds to the user to use the identified peripheral device, the identified peripheral device being configured to substitute display of the provided image that corresponds to the user for display of the read optically readable code on the display screen of the peripheral device, the substituted display of the provided image indicating that the peripheral device corresponds to the user.

A twentieth example provides a peripheral device comprising:

a pairable wireless network interface;

a display screen;

one or more processors, and a memory storing instructions that, when executed by at least one processor among the one or more processors, cause the peripheral device to perform operations comprising:

displaying, on the display screen, an optically readable code for reading by a primary device of a user, the primary device being configured to read the displayed optically readable code via a video camera of the primary device and identify the peripheral device based on the displayed and read optically readable code;

performing, via the pairable wireless network interface, a wireless network pairing of the peripheral device to the primary device of the user in response to the primary device identifying the peripheral device based on the displayed and read optically readable code;

accessing an image that corresponds to the user of the primary device; and substituting display of the accessed image that corresponds to the user for display of the read optically readable code on the display screen of the peripheral device, the substituted display of the accessed image indicating that the peripheral device corresponds to the user.

A twenty-first example provides a carrier medium carrying machine-readable instructions for controlling a machine to carry out the operations (e.g., method operations) performed in any one of the previously described examples.

What is claimed is:

1. A method comprising:
   reading, via a video camera and by one or more processors of a primary device, an optically readable code displayed by a display screen of a peripheral device to be identified for use by a user;
   identifying, by one or more processors of the primary device, the peripheral device based on the read optically readable code displayed by the display screen of the peripheral device;
   performing, by one or more processors of the primary device, a wireless network pairing of the primary device to the identified peripheral device on whose display screen the read optically readable code is displayed; and
   in response to the identifying of the peripheral device, and by one or more processors of the primary device, providing the identified peripheral device with an image that corresponds to the user to use the identified peripheral device, the identified peripheral device being configured to substitute display of the provided image that corresponds to the user for display of the read optically readable code on the display screen of the peripheral device, the substituted display of the provided image indicating that the peripheral device corresponds to the user.

2. The method of claim 1, wherein:
   during display of the optically readable code on the display screen of the peripheral device, the displayed optically readable code indicates that the peripheral device is available for wireless network pairing.

3. The method of claim 1, wherein:
   during display of the image that corresponds to the user on the display screen of the peripheral device, the displayed image that corresponds to the user indicates that the peripheral device is unavailable for wireless network pairing.

4. The method of claim 1, wherein:
   the optically readable code includes a quick response (QR) code unique to the peripheral device among a plurality of peripheral devices wirelessly pairable with the primary device.

5. The method of claim 1, further comprising:
   detecting that the wireless network pairing between the primary device and the peripheral device is interrupted; and
   reading, via the video camera, a further optically readable code displayed by a further display screen of a further peripheral device to be identified.

6. A method comprising:
   displaying, on a display screen of a peripheral device and by one or more processors of the peripheral device, an optically readable code for reading by a primary device of a user, the primary device being configured to read the displayed optically readable code via a video camera of the primary device and identify the peripheral device based on the displayed and read optically readable code;
   performing, by one or more processors of the peripheral device, a wireless network pairing of the peripheral device to the primary device of the user in response to the primary device identifying the peripheral device based on the displayed and read optically readable code;
   accessing, by one or more processors of the peripheral device, an image that corresponds to the user of the primary device; and
   substituting, by one or more processors of the peripheral device, display of the accessed image that corresponds to the user for display of the read optically readable code on the display screen of the peripheral device, the substituted display of the accessed image indicating that the peripheral device corresponds to the user.

7. The method of claim 6, wherein:
   during display of the optically readable code on the display screen of the peripheral device, the displayed optically readable code indicates that the peripheral device is available for wireless network pairing.

8. The method of claim 6, wherein:
   during display of the image that corresponds to the user on the display screen of the peripheral device, the displayed image that corresponds to the user indicates that the peripheral device is unavailable for wireless network pairing.

9. The method of claim 6, wherein:
   the optically readable code includes a quick response (QR) code unique to the peripheral device among a plurality of peripheral devices wirelessly pairable with the primary device.

10. The method of claim 6, further comprising:
    detecting that the wireless network pairing between the peripheral device and the primary device is interrupted; and
    re-displaying, on the display screen of the peripheral device, the optically readable code for reading by a further primary device of a further user.

11. A non-transitory machine-readable medium comprising instructions that, when executed by one or more processors of a primary device, cause the primary device to perform operations comprising:
    reading, via a video camera of the primary device, an optically readable code displayed by a display screen of a peripheral device to be identified for use by a user;
    identifying the peripheral device based on the read optically readable code displayed by the display screen of the peripheral device;
    performing a wireless network pairing of the primary device to the identified peripheral device on whose display screen the read optically readable code is displayed; and
    in response to the identifying of the peripheral device, providing the identified peripheral device with an image that corresponds to the user to use the identified peripheral device, the identified peripheral device being configured to substitute display of the provided image that corresponds to the user for display of the read optically readable code on the display screen of the peripheral device, the substituted display of the provided image indicating that the peripheral device corresponds to the user.

12. The non-transitory machine-readable medium of claim 11, wherein:
    during display of the optically readable code on the display screen of the peripheral device, the displayed optically readable code indicates that the peripheral device is available for wireless network pairing.

13. The non-transitory machine-readable medium of claim 11, wherein:
during display of the image that corresponds to the user on the display screen of the peripheral device, the displayed image that corresponds to the user indicates that the peripheral device is unavailable for wireless network pairing.

14. The non-transitory machine-readable medium of claim 11, wherein the operations further comprise:
detecting that the wireless network pairing between the primary device and the peripheral device is interrupted; and
reading, via the video camera, a further optically readable code displayed by a further display screen of a further peripheral device to be identified.

15. A non-transitory machine-readable medium comprising instructions that, when executed by one or more processors of a peripheral device, cause the peripheral device to perform operations comprising:
displaying, on a display screen of the peripheral device, an optically readable code for reading by a primary device of a user, the primary device being configured to read the displayed optically readable code via a video camera of the primary device and identify the peripheral device based on the displayed and read optically readable code;
performing a wireless network pairing of the peripheral device to the primary device of the user in response to the primary device identifying the peripheral device based on the displayed and read optically readable code;
accessing an image that corresponds to the user of the primary device; and
substituting display of the accessed image that corresponds to the user for display of the read optically readable code on the display screen of the peripheral device, the substituted display of the accessed image indicating that the peripheral device corresponds to the user.

16. The non-transitory machine-readable medium of claim 15, wherein:
during display of the optically readable code on the display screen of the peripheral device, the displayed optically readable code indicates that the peripheral device is available for wireless network pairing.

17. The non-transitory machine-readable medium of claim 15, wherein: during display of the image that corresponds to the user on the display screen of the peripheral device, the displayed image that corresponds to the user indicates that the peripheral device is unavailable for wireless network pairing.

18. The non-transitory machine-readable medium of claim 15, wherein the operations further comprise:
detecting that the wireless network pairing between the primary device and the peripheral device is interrupted; and
reading, via the video camera, a further optically readable code displayed by a further display screen of a further peripheral device to be identified.

19. A primary device comprising:
a pairable wireless network interface;
a video camera;
one or more processors; and
a memory storing instructions that, when executed by at least one processor among the one or more processors, cause the primary device to perform operations comprising:
reading, via the video camera, an optically readable code displayed by a display screen of a peripheral device to be identified for use by a user;
identifying the peripheral device based on the read optically readable code displayed by the display screen of the peripheral device;
performing, via the pairable wireless network interface, a wireless network pairing of the primary device to the identified peripheral device on whose display screen the read optically readable code is displayed; and
in response to the identifying of the peripheral device, providing the identified peripheral device with an image that corresponds to the user to use the identified peripheral device, the identified peripheral device being configured to substitute display of the provided image that corresponds to the user for display of the read optically readable code on the display screen of the peripheral device, the substituted display of the provided image indicating that the peripheral device corresponds to the user.

20. A peripheral device comprising:
a pairable wireless network interface;
a display screen;
one or more processors; and
a memory storing instructions that, when executed by at least one processor among the one or more processors, cause the peripheral device to perform operations comprising:
displaying, on the display screen, an optically readable code for reading by a primary device of a user, the primary device being configured to read the displayed optically readable code via a video camera of the primary device and identify the peripheral device based on the displayed and read optically readable code;
performing, via the pairable wireless network interface, a wireless network pairing of the peripheral device to the primary device of the user in response to the primary device identifying the peripheral device based on the displayed and read optically readable code;
accessing an image that corresponds to the user of the primary device; and
substituting display of the accessed image that corresponds to the user for display of the read optically readable code on the display screen of the peripheral device, the substituted display of the accessed image indicating that the peripheral device corresponds to the user.

\* \* \* \* \*

UNITED STATES PATENT AND TRADEMARK OFFICE
CERTIFICATE OF CORRECTION

PATENT NO. : 11,240,102 B2
APPLICATION NO. : 17/047520
DATED : February 1, 2022
INVENTOR(S) : Andrew Butler It is certified that error appears in the above-identified patent and that said Letters Patent is hereby corrected as shown below:

In the Specification

Column 3, Line 63, delete "II))," and insert --ID),-- therefor

Column 5, Line 14, delete "600" and insert --300-- therefor

Column 6, Line 60, delete "40" and insert --400-- therefor

Column 11, Line 39, delete "comprising." and insert --comprising:-- therefor

Column 13, Line 30, delete "wherein," and insert --wherein:-- therefor

Column 13, Line 30, before "during", insert a linebreak

Column 13, Line 57, delete "code," and insert --code;-- therefor

Column 13, Line 57, before "accessing", insert a linebreak

Signed and Sealed this
Fourteenth Day of June, 2022

Katherine Kelly Vidal
*Director of the United States Patent and Trademark Office*